Dec. 26, 1967 R. G. FIKE 3,359,998
PRESSURE CONTROL VALVES FOR FUEL LINES
Filed Oct. 1, 1964 3 Sheets-Sheet 2

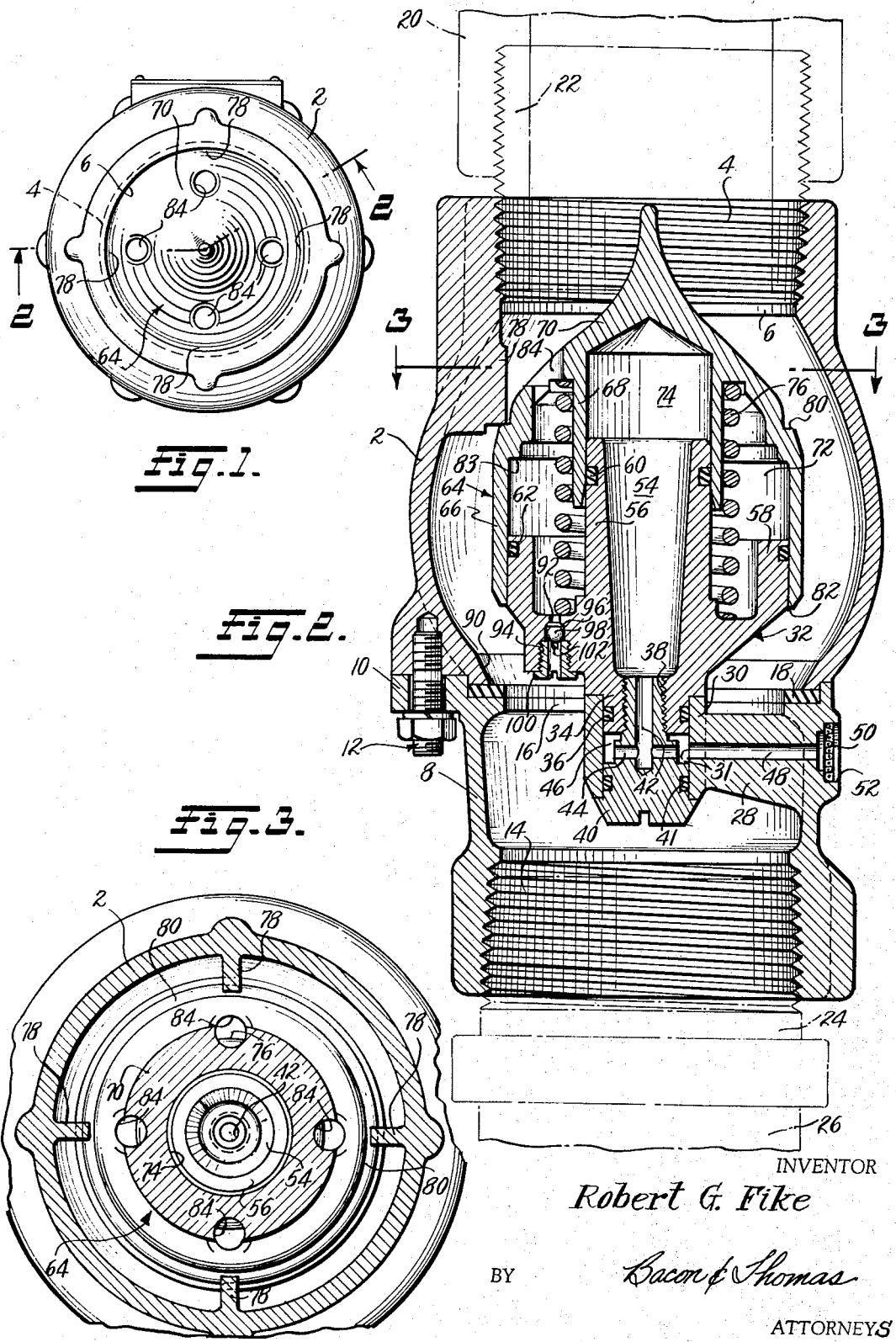

INVENTOR
Robert G. Fike
BY
Bacon & Thomas
ATTORNEYS

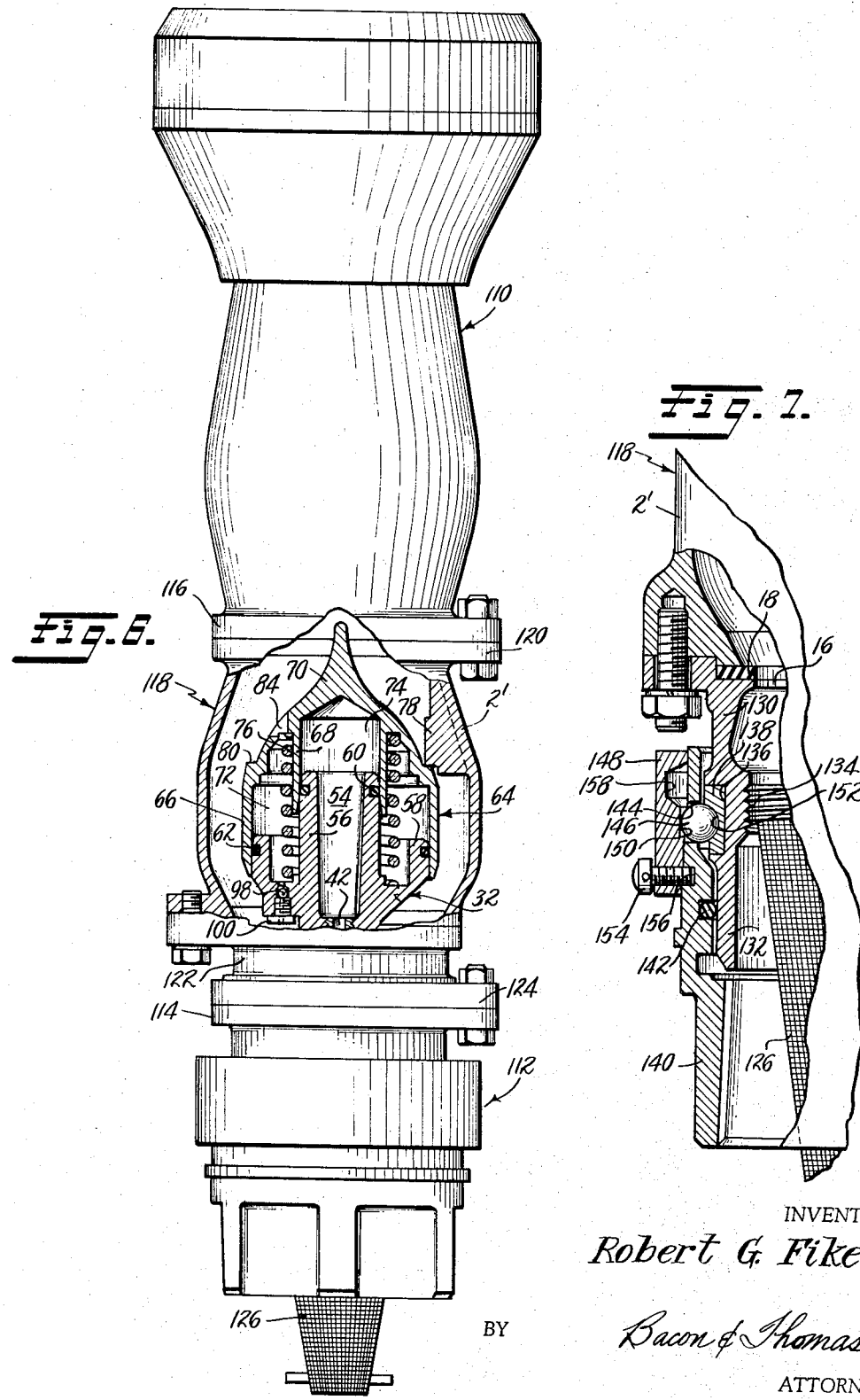

United States Patent Office 3,359,998
Patented Dec. 26, 1967

3,359,998
PRESSURE CONTROL VALVES FOR FUEL LINES
Robert G. Fike, Fairfax, Va., assignor to Donald G. Griswold, Newport Beach, Calif.
Filed Oct. 1, 1964, Ser. No. 400,859
10 Claims. (Cl. 137—220)

ABSTRACT OF THE DISCLOSURE

Pressure control valve in which an axially slidable valve element is normally urged toward open position by an established, predetermined but yieldable force provided by spring pressure and/or air pressure, preselected to maintain and limit maximum line pressure in a conduit connected with the valve outlet, and which valve element is responsive to outlet pressure and is urged toward closed position when the outlet pressure exceeds the predetermined force.

---

This invention relates to a pressure control valve to be placed in a fuel line for refueling aircraft and particularly jet aircraft, to control and limit the fuel pressure that can be built up in the aircraft piping system, and for use in other applications where control of discharge pressure is desired.

The high speed fueling of aircraft with pressurized ground fueling facilities, either in the form of hydrants or fueling trucks has created problems of dynamic pressure surges within the aircraft piping system. Such systems generally include a manifold leading to a number of wing tank cells with an inlet to the manifold located on the bottom surface of the wing. Often fuel is pumped into the aircraft system through two or more inlets, involving the use of substantial lengths of hose. Many factors can cause pressure surges in the manifold and aircraft piping, such as the closing of a manifold valve or valves by the pilot, by closing of float valves in the wing tanks or by surges created by the fuel pumping mechansm. It is important that such surges be prevented from developing high and destructive pressures within the aircraft piping. Installation of control devices in the underground system or on the trucks or refueling carts are only partially effective because an increase in pressure in the aircraft piping must travel the distance from the nozzle back to the control device and this is often a very substantial distance through hose which can aggravaate the surge condition and the time lag can be sufficient for destructive pressures to develop within the aircraft before the control device can respond.

The pressure control valve of the present invention is adapted to be located within the fueling hose very close to the aircraft and is intended to be positioned within or closely adjacent the usual nozzle on the end of the fuel line, by which the fuel line is connected to the inlet on the aircraft wing.

In general the invention comprises a pressure control valve in the fuel line at or adjacent a nozzle wherein any pressure surge within the aircraft system, detectible at the outlet of the control valve, which pressure exceeds a predetermined set limit causes the valve to close either completely or partially so as to restrict or cut off pressure being transmitted from the fuel line into the aircraft. It is further contemplated, as will be described, that the pressure limiting valve of the present invention may also be used as a pressure regulator. As will be described, the pressure control valve of the present invention involves many novel structural features which will be more fully described hereinafter.

It is to be noted that the principles of this invention may also be used in air-to-air refueling of aircraft.

It is, therefore, an object of this invention to provide a valve to control and limit the pressure applied in the fueling conduits of an aircraft by limiting the maximum pressure at the under-wing fueling nozzle used for such aircraft.

Another object of the invention is to provide a control valve of the type set forth which is of lightweight and positioned at or near a fueling nozzle for greater effectiveness and rapid resistance to pressure fluctuation in the aircraft piping system.

Still another obect is to provide such a pressure control valve readily adaptable for inclusion in any conventional aircraft fueling line.

A further object is to provide a pressure control valve of the type set forth adapted to insure a fixed discharge pressure, which is tamper proof and provided with no external or internal adjustments capable of inadvertent misadjustment.

A still further object is to provide a pressure control valve of the type set forth that will, without further attention, remain open at all times for return flow or defueling of the aircraft whenever necessary or desirable.

An additional object is to provide a valve achieving the objectives set forth above wherein a minimum pressure drop through the valve itself is produced.

A further object is to provide a pressure control valve as set forth which is stable in operation, having no hunting or oscillations at low flow rates.

Another additional object is to provide such a valve requiring no external pilot controls.

A still further object is to provide a pressure control valve achieving the aforesaid objectives which is also simple and economical to construct yet efficient and reliable in operation.

More objects and advantages will become apparent to those skilled in the art as the description proceeds with reference to the accompanying drawings wherein:

FIG. 1 is an end view of a valve embodying the present invention, as viewed from the outlet end thereof;

FIG. 2 is an enlarged vertical sectional view of the valve of FIG. 1 taken along the angled line 2—2 of FIG. 1 showing the valve in its normal or open position;

FIG. 3 is a transverse sectional view taken substantially along the line 3—3 of FIG. 2;

FIG. 6 is a schematic elevational view with parts broken away showing how the valve of the present invention may be incorporated in existing nozzle structures; and FIG. 7 is a fragmentary sectional view of a further embodiment somewhat similar to FIG. 6.

Figures 4, 5:
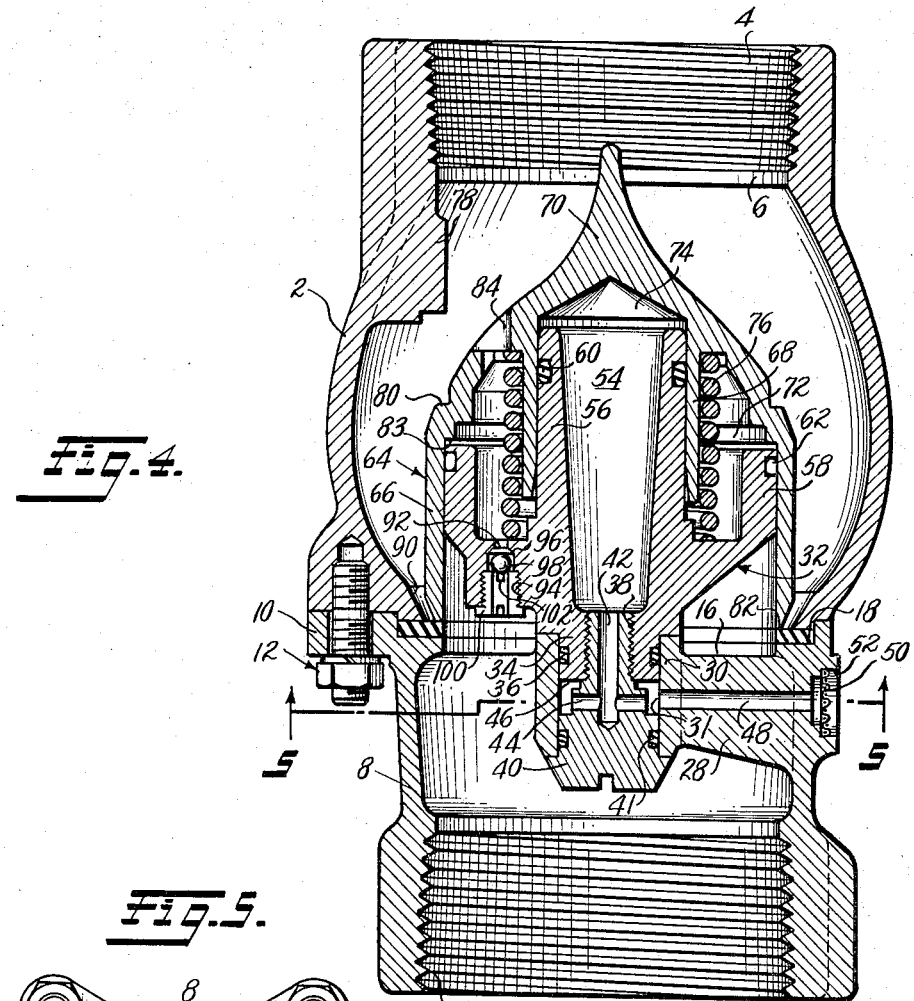
FIG. 4 is a sectional view similar to FIG. 2 but showing the valve parts in different relative positions, the valve being shown closed.
FIG. 5 is a transverse sectional view taken along the line 5—5 of FIG. 4.

Referring first to FIGS. 1 through 5, a preferred form of the invention is shown as comprising a hollow body 2 provided at one end with internal threads 4 extending outwardly from an outlet port 6. The other end of the hollow body 2 is provided with a removable collar structure 8, secured to the body 2 by means of flanges 10 and stud-and-nut 12, or the like. The outer end of collar structure 8 is provided with internal threads 14 and also defines in part an inlet port 16. As shown, the collar structure 8 serves to clamp a valve seat ring 18 in fixed position against the end of hollow body 2. Preferably, the valve seat ring 18 is of suitable resilient material, the inner diameter of which further serves to define the inlet port 16. Numeral 20 indicates, in phantom line, a nozzle structure which may be any conventional nozzle employed to connect a fuel line to the aircraft fuel inlet.

As shown, the valve of the present invention is connected to the nozzle 20 by means of a nipple 22 threadably received in the nozzle 20 and in the internal threads 4. The internal threads 14 on the collar member 8 threadedly receive an externally threaded coupling 24 normally secured to an end of a fueling hose 26.

Extending diametrically across the inside of collar member 8 (see FIG. 5 also) adjacent inlet port 16 is a bridge or spider 28. It is to be noted that only one-half of the spider 28 is shown in FIG. 2 because of the angle on which the sectional view is taken. The spider 28, however, consists of a pair of opposed arms joined to a central hub 30 having bore 31 therethrough. A fixed member generally designated at 32 is provided with a neck portion 34 extending into the bore 31 and sealed therein by O-ring 36. The fixed member 32 is provided with a threaded bore 38 which threadedly receives a clamp member 40 having a head bearing against the outer end of the hub member 30 and sealed in bore 31 by O-ring 41. Thus, it will be seen that the fixed member 32 is fixedly supported on the spider 28 inwardly of the inlet port 16. The clamp member 40 is provided with a central bore 42 communicating with a radial bore 44 therein, and which provides communication with an annular space 46, as shown. Extending from the annular space 46 is a passageway 48 through one arm of the spider 28 to the exterior of the collar member 8. As shown, a screen or other suitable filter 50 is seated in a counterbore 52 in the collar member 8 to prevent entry of foreign matter into the passageway 48. The central bore 42 communicates with the hollow interior 54 of an inner hollow cylindrical member 56 comprising an integral portion of the fixed member 32. The fixed member 32 is also provided with a hollow cylindrical flange or sleeve-like portion 58 concentric to but spaced outwardly from the cylindrical element 56.

The outer surfaces of the hollow cylindrical elements 56 and 58 are provided with circumferential grooves receiving suitable O-ring type sealing means 60 and 62, respectively, or any other suitable sealing means. Preferably, these O-rings are of Teflon or the like, a well-known material of low coefficient of friction.

A valve member 64 comprises an outer sleeve 66 telescopically and slidably embracing the outer cylinder 58 and being axially slidable thereon. The valve member 64 also is provided with an inner cylindrical sleeve 68 telescopically and slidably embracing the inner cylindrical member 56. It is to be noted that the upper end of the valve member 64 is substantially closed and streamlined to direct fluid flow smoothly out through the outlet port 6 and it is to be noted that the closed end 70 of the valve member 64 is closely adjacent and faces the outlet port 6. As shown, the telescopically related portions of the fixed member 32 and valve member 64 define therebetween an outer chamber 72 and an inner chamber 74. As shown, a compression spring 76 is positioned in the outer chamber to react against both the fixed member 32 and the valve member 64 to urge the latter upwardly in a direction away from the valve seat ring 18 and toward the outlet port 6. A plurality of inwardly extending ribs 78 are formed on the inner surface of the body 2 in position to engage an annular shoulder 80 on the valve member 64 and thus limit movement of the valve member toward the outler port 6. It is to be noted that when the valve member 64 engages the ribs 78 a flow passage is provided from the inlet port 16 to the outlet port 6 between the valve member 64 and the hollow body 2, the flow passage being annular in shape. All of the major structural elements thus far described are preferably made of aluminum or other lightweight metal or alloy.

The end of the valve member 64 opposite the closed end 70 is provided with an annular edge 82 axially opposed to a surface of the valve seat ring 18. When the valve member 64 is moved downwardly to the position shown in FIG. 4, the annular edge 82 sealingly engages the valve seat ring 18 to thus completely close the previously described flow path from the inlet port 16 to the outlet port 6. Since the valve seat ring 18 is of relatively soft material, a shoulder 83 on valve member 64 is positioned to engage the upper end of sleeve 58 after the valve is closed but before the ring 18 is cut or compressed to an undesired degree. It will also be apparent that movement of the valve member 64 downwardly from its position shown in FIG. 2 to a position approaching but not touching the valve seat 18 will provide restriction in the flow path serving to effect a pressure reduction in the fuel flowing from the inlet port 16 to the outlet port 6 and thus reducing the pressure at that outlet port. This is true because the higher pressure at the inlet causes relatively high velocity flow past the edge 82 (when the valve approaches its closed condition) and the static pressure exerted against that edge is very low.

As shown in the drawings, the closed end of the valve member 64 is provided with one or more openings 84 therein providing communication between the outer chamber 72 and the interior of the body 2 adjacent the outlet port 6. As previously described, the passageways 48 and 42 provide communication between the inner chamber 74 and ambient atmosphere. From the structure thus far described it will be apparent that the fixed member 32 and valve member 64 define a piston and cylinder combination wherein the expandsible chamber 74 defines a fixed and invariable area on one side of which is atmospheric pressure and on the other side of which is fluid pressure existing at the outlet port 6. The spring 76 is of precalculated strength and rate so as to predetermine the value of unit fluid pressure acting on the closed end 70 at the outlet port 6 at which the valve member 64 will start to move in a valve closing direction and the spring 76 may be designed to have a slow or rapid rate whereby the pressure of fluid at the outlet port 6 will cause the valve 64 to close rapidly upon a small increase over a predetermined pressure or to close gradually and thus effect a pressure regulation to maintain the fluid pressure at the outlet port 6 substantially constant at all times.

From the structure thus far described it will be apparent that any pressure surges in the aircraft piping will be immediately apparent at the outlet port 6 and when those pressure surges reach the maximum desired value, the described valve will close and cut off further flow from the fuel line thus preventing destructive build-up of pressure surges.

The openings 84 previously referred to provide for pressure equalization in the outer chamber 72 and the region adjacent the outlet port 6 so that the transverse area of the inner chamber 74 is the only factor determining the pressure value at which the valve closes. Since that transverse area is fixed and invariable, the spring 76 then determines the maximum pressure that can be delivered to the outlet port 6. Obviously the spring 76 could be positioned in the inner chamber 74 if desired. It is also to be noted that, with or without a compression spring 76, a suitable connection may be made to the passageway 48 for the introduction of a variable or controlled fluid pressure to the inner chamber 74 and the value of that fluid pressure could be employed to effect variable pressure regulation in a manner that will be obvious to those skilled in the art.

It will also be apparent that when it is desired to change the fixed or predetermined pressure to be delivered to the outlet port 6, the collar 8 may be removed from body 2 at which time the valve seat ring 18 is also removable. The inner diameter of the valve seat ring 18 is of smaller diameter than the outer diameter of the outer sleeve 66 of valve member 64 to function in the manner described. However, the outer diameter of the sleeve 66 is less than the inner diameter of the opening 90 at the inlet port end of the body member 2 so that the entire valve 70 may be readily removed from the body 2 whereupon the spring 76 may be replaced by a spring of different characteristics when and if desired.

As stated previously, it is contemplated that the present valve be employed as a part of or closely adjacent a suitable nozzle. Conventionally, such nozzles are provided with a manually actuable valve whereby flow may be cut off. It could happen that flow would be cut off manually at the nozzle at a time when a high surge of pressure existed at the outlet port 6 sufficient to close the valve 64. Under those conditions high pressure would be trapped between the nozzle valve and the inlet port 16 and the valve 64 would thus be held in closed position. To remedy this situation, the fixed member 32 is provided with an opening 92 therein communicating with a threaded passageway 94 at the lower end of the fixed member 32 and facing the inlet port 16 inwardly of the valve seat ring 18. The passageway 92 is provided with a ball valve seat 96 and a ball 98 is held thereadjacent by a ball retainer 100 threaded in the opening 94. The retainer 100, however, does not hold ball 98 firmly against the seat 96 but permits a slight movement of the ball away from that seat. When the ball 98 falls away from seat 96, a vent passage is provided around the ball, through a notch 102 in retainer 100 and through the central bore shown in the ball retainer. During normal fuel flow through the valve, pressure at the inlet port 16 is sufficiently greater than the pressure at the vent openings 84 to normally hold the ball in its upper position. However, when high pressure is trapped at the outlet port 6 with the valve 64 closed, as suggested hereinabove, it will be obvious that the higher pressure existing at the outlet port after flow through hose 26 has terminated, will cause the ball 98 to be pushed away from its seat 96 and thus vent the high pressure at the outlet 6, through inlet port 16, and bring the pressures at the inlet and outlet ports to equalized values. Under these conditions the spring 76 will be effective to move the valve 64 to its fully opened position provided that the force exerted by the pressure at 6 is less than the force of the spring 76 whereupon the valve is ready for a subsequent operation in the manner already described without having to manually release the pressure trapped in the nozzle.

FIG. 6 illustrates a further adaptation of a pressure control valve of the present invention. The portions shown in section in FIG. 6 are to be considered identical to corresponding portions already described. Numerals 110 and 112 indicate portions of a conventional manually operated nozzle structure presently in use. In the conventional structure the flange 114 of portion 112 is bolted directly to the flange 116 of portion 110 and the assembly thus constitutes a valve having manual controls and other features not shown in the drawings but well known to those skilled in the art. Numeral 118 indicates generally a modified form of the pressure control valve already described wherein the body member 2′ is not provided with the internal threads 4 at the outlet end but is provided instead with a flange 120 matable with the flange 116 whereby it may be secured directly to the portion 110 of the nozzle. The inlet end of the body 2′ may be identical in structure to that shown and described in FIG. 6, 1–5, but the collar 8 previously described is replaced in this embodiment with a collar 122 secured to the body 2′ in the same manner as the collar 8 is secured to the body 2 of FIG. 2. The collar 122, however, instead of being provided with the internal threads 14 is provided with a flange 124 matable with the flange 114 whereby the nozzle portion 112 and the flange 124 may be secured together by bolts or the like. In all operational respects, the valve shown in FIG. 6 operates identically to that already described. Obviously, the flanges 120 and 124 may be so configured and designed so as to mate with any desired nozzle or fuel line coupling members.

In the conventional nozzle structure referred to, the portion 112 comprises a swivel for attachment to a fuel hose, such as the hose 26 previously referred to and includes a strainer or filter structure 126. If desired, the valve of the present invention could be initially provided with such a swivel 112 and/or filter 126 rather than employing such parts from the conventional nozzle referred to.

FIG. 6 is a fragmentary sectional view of a further embodiment wherein the valve of the present invention includes portions of a swivel connection which also serves as a release means. In FIG. 7 numeral 2′ designates the same body member as shown in FIG. 6 and which may be considered to be attached to the nozzle portion 110 in the same manner. The nozzle portion 110 must conventionally be turned about its axis for locking connection to the fuel inlet fitting of the aircraft and it is desirable to provide a swivel connection between the nozzle and the fuel hose. In FIG. 7 the collar 122 of FIG. 6 is replaced by a collar 130 similar thereto and secured to body 2′ in the same manner but having a depending skirt 132 instead of the flange 124. The skirt 132 is internally threaded at 134 to receive a screen or filter 126. An external groove 136 in skirt 132 receives a grooved split ring 138 serving as an inner ball race. A coupling sleeve 140 may be secured to the fuel hose in any convenient manner and is slidably and rotatably telescoped over the skirt 132, being sealed thereto by O-ring 142. Sleeve 140 is provided with openings 144 therein and balls 146 are loosely positioned in those openings and engage the inner ball race ring 138. A retainer ring 148 slidably embraces the coupling sleeve 140 and is provided with an inner surface 150 holding the balls 146 in the groove 152 of ring 138 and also serving as an outer ball race. The retainer ring 148 is held in the position described and shown by a screw or pin 154 engaging in groove 156 in sleeve 140. The ring 148 is also provided with an internal groove 158, as shown. When it is desired to disconnect the sleeve 140 and fuel hose from the valve 118, the screw 154 may be retracted from groove 156 whereupon ring 148 may be moved downwardly to position groove 158 opposite the balls 146. In this position the balls 146 are free to move outwardly into groove 158 whereupon sleeve 140 may be pulled downwardly off skirt 132. Obviously screw 154 could be replaced by a spring-pressed pin or other equivalent latching means.

While a limited number of specific embodiments of the invention have been shown and described herein, it is to be understood that the same are merely illustrative of the principles involved and that other embodiments and modifications may be resorted to within the scope of the appended claims.

I claim:

1. A pressure control valve for use in a fuel line or the like, comprising: a generally hollow body having an inlet port and an outlet port axially aligned therewith, said inlet port having a valve seat surrounding the same; means for securing a nozzle to said body at said outlet port for receiving flow therefrom; means for securing a fuel supply conduit to said body at said inlet port for directing flow thereinto; valve means in said body including an annular edge arranged to engage said seat to obstruct the flow therethrough from said inlet port to said outlet port, said valve means including a hollow axially movable valve member providing a pressure chamber, and force applying means within said valve member normally urging said valve member axially to its open position and in a direction toward said outlet port with a substantially constant and predetermined but yieldable force, said axially movable valve member having an integral closed end portion with pressure equalizing passage means therein communicating with said pressure chamber and exposed to the outlet pressure of the fuel in said body adjacent said outlet port and being responsive to said outlet pressure to move axially toward said inlet port to close the same when said outlet fuel pressure exerts a force on said closed end portion exceeding said predetermined force.

2. A valve as defined in claim 1 wherein said valve means comprises said annular valve seat surrounding said inlet port; a fixed member mounted centrally in said body adjacent said inlet port; said movable valve member comprising a sleeve slidably embracing said fixed member and having said annular edge at one end movable therewith into sealing engagement with said valve seat, the other end of said sleeve constituting said closed end portion exposed to the pressure of said fuel.

3. A valve as defined in claim 2 including a support element on said body outwardly of said inlet port and having a portion extending inwardly through said inlet port and supporting said fixed member.

4. A valve as defined in claim 3 including cooperating means between said sleeve and fixed member defining an expansible chamber therebetween; spring means between said sleeve and fixed member urging said sleeve toward said outlet port; and a passageway providing atmospheric communication between said chamber and the exterior of said body.

5. A pressure control valve for a fuel line comprising: a generally hollow body having an inlet port and an outlet port therein; an annular valve seat extending around the periphery of said inlet port; a hub supported centrally in said body; a support member secured to said hub and having a portion smaller than said inlet port extending inwardly through said inlet port; a movable valve member inside said body slidably and telescopically mounted on said support member for movement thereon toward and from said inlet and outlet ports; said valve member having an annular edge at one end sealingly engageable with said valve seat, the outer dimensions of said valve member being less than the inner dimensions of said body whereby to define a generally annular flow path therebetween from said inlet to said outlet port, and spring means, reacting between said support member and valve member, urging said valve member away from said inlet port to normally maintain said valve open.

6. A valve as defined in claim 5 including fixed stop means in said body, engageable with said valve member to limit movement thereof in a direction toward said outlet port.

7. A valve as defined in claim 5 wherein said support member is removably mounted on said body whereby to be removable therefrom for replacement of said spring means.

8. A valve as defined in claim 5 wherein said support member is carried by an annular structure removably fixed to said body around said inlet port; said valve seat being a separate ring removably held in fixed position around said inlet port by said annular structure; the outer dimensions of said valve member being less than the diameter of said inlet port but greater than the inner diameter of said separate ring.

9. A valve as defined in claim 5 wherein said support member, inwardly of said inlet port, comprises inner and outer concentric hollow cylindrical elements; said valve member comprising inner and outer concentric hollow cylindrical elements respectively slidably and telescopically embracing the corresponding cylindrical elements of said support member and defining inner and outer chambers therebetween; a passageway, from said inner chamber, through said support member, to atmosphere outside said body; a compression spring in one of said chambers urging said valve member in a direction away from said valve seat; and at least one opening providing pressure equalizing communication between said outer chamber and the interior of said body adjacent said outlet port.

10. A valve as defined in claim 9 including a further passageway in said support member providing communication between said outer chamber and said inlet port even when said valve member engages said valve seat; and a check valve in said further passageway arranged to be opened by pressure in said outer chamber, when said valve is closed and pressure at said outlet port is greater than pressure at said inlet port, to equalize said pressures and permit said spring to open said valve.

References Cited

UNITED STATES PATENTS 2,608,204  8/1952  Dunn _____ 137—220

FOREIGN PATENTS 678,563  1/1930  France.
1,197,980  6/1959  France.

M. CARY NELSON, *Primary Examiner.*

A. ROSENTHAL, J. W. KNIGHT, *Assistant Examiners.*